(12) United States Patent
Kahara et al.

(10) Patent No.: US 12,111,481 B2
(45) Date of Patent: Oct. 8, 2024

(54) LENS AND OPTICAL COMPONENT

(71) Applicant: Sumitomo Electric Industries, Ltd., Osaka (JP)

(72) Inventors: Akinori Kahara, Osaka (JP); Masato Hasegawa, Osaka (JP); Toshihiro Yoshida, Osaka (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 17/669,923

(22) Filed: Feb. 11, 2022

(65) Prior Publication Data

US 2022/0163698 A1  May 26, 2022

Related U.S. Application Data

(63) Continuation of application No. 15/523,049, filed as application No. PCT/JP2015/080763 on Oct. 30, 2015, now abandoned.

(30) Foreign Application Priority Data

Oct. 30, 2014  (JP) .................................. 2014-221615

(51) Int. Cl.
  *G02B 5/22*   (2006.01)
  *G02B 1/11*   (2015.01)
  (Continued)

(52) U.S. Cl.
  CPC .................. *G02B 3/00* (2013.01); *G02B 1/11* (2013.01); *G02B 3/0012* (2013.01); *G02B 5/18* (2013.01);
  (Continued)

(58) Field of Classification Search
  CPC ... G02B 3/00; G02B 1/11; G02B 5/18; G02B 13/14; G02B 2003/0093
  (Continued)

(56) References Cited

U.S. PATENT DOCUMENTS 5,569,501 A   10/1996  Bailey et al.
6,262,844 B1   7/2001  Soskind
(Continued)

FOREIGN PATENT DOCUMENTS

JP   H03-197676 A   8/1991
JP   6-222203 A    8/1994
(Continued)

OTHER PUBLICATIONS

"Thermal, structural and optical properties of Cleartran multispectral zinc sulfide", Optical Engineering 47(11), 114001, Nov. 2008 (Year: 2008).*

(Continued)

*Primary Examiner* — Audrey Y Chang
(74) *Attorney, Agent, or Firm* — McCarter & English, LLP; Michael A. Sartori

(57) ABSTRACT

There are provided a lens having excellent mechanical strength, as well as an optical component employing the lens. The lens is a lens having a circular shape when viewed in a plan view, the lens having a thickness of not less than 1 mm and not more than 11 mm at a lens center, the lens having a lens diameter of not less than 2 mm and not more than 50 mm, the lens having a curvature of not less than $-0.5$ mm$^{-1}$ and not more than $0.5$ mm$^{-1}$ at the lens center.

5 Claims, 4 Drawing Sheets

(51) Int. Cl.
  *G02B 3/00* (2006.01)
  *G02B 5/18* (2006.01)
  *G02B 13/14* (2006.01)
(52) U.S. Cl.
  CPC ......... *G02B 5/1876* (2013.01); *G02B 5/1895* (2013.01); *G02B 13/14* (2013.01); *G02B 2003/0093* (2013.01)
(58) Field of Classification Search
  USPC .................................................. 359/565, 566
  See application file for complete search history.

(56) References Cited

U.S. PATENT DOCUMENTS

| | | | |
|---|---|---|---|
| 6,292,293 | B1 | 9/2001 | Chipper |
| 2003/0090987 | A1 | 5/2003 | Kitahara et al. |
| 2009/0067040 | A1 | 3/2009 | Izumi |
| 2009/0067041 | A1 | 3/2009 | Izumi |
| 2009/0290237 | A1 | 11/2009 | Tung |
| 2010/0254006 | A1 | 10/2010 | Ueno et al. |
| 2010/0321940 | A1 | 12/2010 | Zhong |
| 2011/0234974 | A1* | 9/2011 | Lawu ............ G02C 7/06 623/6.11 |

FOREIGN PATENT DOCUMENTS

| | | | |
|---|---|---|---|
| JP | 10-319212 A | 4/1998 |
| JP | 10-123304 A | 5/1998 |
| JP | 2000-296448 A | 10/2000 |
| JP | 2001-057642 A | 2/2001 |
| JP | 2003-020233 A | 1/2003 |
| JP | 2004-307330 A | 11/2004 |
| JP | 2008-268281 A | 11/2008 |
| JP | 2008-304642 A | 12/2008 |
| JP | 2009-063941 A | 3/2009 |
| JP | 2009-063942 A | 3/2009 |
| JP | 2009-115871 A | 5/2009 |
| JP | 2011-221048 A | 11/2011 |
| JP | 2014-32239 A | 2/2014 |
| WO | 2007/119838 A1 | 10/2007 |
| WO | 2011/083692 A1 | 7/2011 |
| WO | 2012/128385 A1 | 9/2012 |

OTHER PUBLICATIONS

Ganqing Xu, Infrared Physics & Technology, Xidian University Publishing House, Dec. 1989, pp. 162-169. [Cited in Parent.].

Notification of Reexamination issued in counterpart Chinese Patent Application No. 201580059160.6 dated Aug. 16, 2021. [Cited in Parent.].

Tomoyuki Ueno et al., "The development of ZnS lenses for use in the far-infrared camera," SEI Technical Review, Jul. 2009, No. 175, pp. 50-56. [Cited in Parent.].

Tomoyuki Ueno et al., "ZnS lenses for environment-resisting far-infrared cameras," SEI Technical Review, Jul. 2010, No. 177, pp. 134-136. [Cited in Parent.].

Notice of Reasons for Refusal issued in counterpart Japanese Patent Application No. 2016-556660 dated May 11, 2021. [Cited in Parent.].

II-VI Infrared Materials (Year: 2009). [Cited in Parent.].
Young's Modulus (Wikipedia). [Cited in Parent.].

* cited by examiner

LENS AND OPTICAL COMPONENT

TECHNICAL FIELD

The present invention relates to a lens and an optical component employing the lens.

BACKGROUND ART

In recent years, various types of infrared detection devices have been developed to detect infrared ray resulting from heat emitted by or dissipated from an object. These infrared detection devices are used for in-vehicle cameras, security cameras, thermography, airplanes, satellites, and the like, and are often used outdoors. Under such environment, a flying object may collide with such an infrared detection device.

If a lens among components of the infrared detection device is broken due to an impact from the flying object, the infrared detection device itself cannot function. Therefore, in order to protect the lens from the impact from the external flying object, a technique has been proposed to install a protection window composed of germanium near the entrance surface side of the lens, for example.

For example, Patent Document 1 (Japanese Patent Laying-Open No. 2001-057642) discloses an infrared camera including: an infrared lens for collecting infrared rays and forming an image; an image capturing unit for converting, into an electric signal, the infrared image formed by the infrared lens; a case for storing the infrared lens and the image capturing unit; and a window disposed on the infrared-ray entrance side of the infrared lens and joined to the case.

CITATION LIST

Patent Document

PTD 1: Japanese Patent Laying-Open No. 2001-057642

SUMMARY OF INVENTION

Technical Problem

However, when the protection window is installed near the lens, transmittance for external light is decreased, disadvantageously. Moreover, the installation of the protection window leads to restrictions in size of the infrared detection device, disadvantageously. In order to prevent the function of the optical device from being decreased due to an impact from outside without installing the protection window, it is necessary to improve mechanical strength of the lens itself.

Therefore, it is an object to provide a lens having excellent mechanical strength and an optical component employing the lens.

Solution to Problem

[1] A lens according to one embodiment of the present invention is a lens having a circular shape when viewed in a plan view, the lens having a thickness of not less than 1 mm and not more than 11 mm at a lens center, the lens having a lens diameter of not less than 2 mm and not more than 50 mm, the lens having a curvature of not less than $-0.5$ mm$^{-1}$ and not more than $0.5$ mm$^{-1}$ at the lens center.

[2] An optical component according to one embodiment of the present invention is an optical component including: the lens recited in [1]; and a diamond like carbon film covering at least a portion of an entrance surface of the lens.

[3] An optical component according to one embodiment of the present invention is an optical component including: the lens recited in [1]; and an anti-reflection film covering at least a portion of an entrance surface of the lens.

Advantageous Effects of Invention

According to the above embodiment, there can be provided a lens having excellent mechanical strength and an optical component employing the lens. Accordingly, no protection window for protecting the lens needs to be installed.

DESCRIPTION OF EMBODIMENTS

Figure 1:
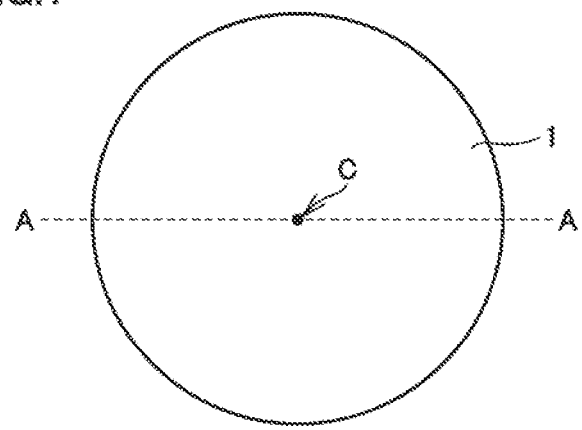
FIG. 1 is a plan view of a lens according to one embodiment of the present invention.

Description of Embodiments of the Present Invention

First, embodiments of the present invention are listed and described.

(1) A lens according to one embodiment of the present invention is a lens having a circular shape when viewed in a plan view, the lens having a thickness of not less than 1 mm and not more than 11 mm at a lens center, the lens having a lens diameter of not less than 2 mm and not more than 50 mm, the lens having a curvature of not less than $-0.5$ mm$^{-1}$ and not more than $0.5$ mm$^{-1}$ at the lens center.

By setting the thickness at the lens center, the lens diameter, and the curvature at the lens center to fall within the above-mentioned ranges, the mechanical strength of the lens can be improved.

(2) The thickness of the lens at the lens center and the lens diameter of the lens at the lens center preferably exhibit a relation of the following formula (A):

Lens diameter (mm)≤20×thickness (mm)−50   (A).

When the thickness and lens diameter at the lens center exhibit the relation of the above formula (A), the mechanical strength of the lens is more improved.

(3) The lens is preferably a biconvex lens. The biconvex lens can be suitably used for wide-angle detection.

(4) The lens is preferably a meniscus lens. The meniscus lens can be used suitably in broad applications from the wide-angle detection to telescopic detection.

(5) The lens is preferably a diffractive lens. The diffractive lens has an excellent spatial frequency resolution to provide an excellent image.

(6) An optical component according to one embodiment of the present invention is an optical component including: the lens recited in any one of (1) to (5); and a diamond like carbon (hereinafter, also referred to as "DLC") film (hereinafter, also referred to as "DLC film") covering at least a portion of an entrance surface of the lens.

The DLC film has very high hardness, and has excellent mechanical strength. Moreover, the DLC film also has a high light transmittance. Therefore, when the DLC film is formed on the lens surface, the mechanical strength and light transmittance of the surface of the optical component can be improved.

(7) An optical component according to one embodiment of the present invention is an optical component including: the lens recited in any one of (1) to (5); and an anti-reflection film (AR film) covering at least a portion of an entrance surface of the lens. Accordingly, the light transmittance of the lens is improved.

Details of Embodiments of the Present Invention

The following describes specific examples of a lens and an optical component according to an embodiment of the present invention with reference to figures. Hereinafter, in the figures of the present application, the same reference character indicates the same or corresponding portion. Moreover, dimensional relations such as length, size, and width in the figure are changed appropriately for the purpose of clarity and simplicity of the figures, and do not represent actual dimensions.

First Embodiment

The following describes a lens according to one embodiment of the present invention with reference to FIG. 1 to FIG. 6.

FIG. 1 shows a plan view of a lens 1 according to one embodiment of the present invention. As shown in FIG. 1, lens 1 has a circular shape when viewed in a plan view. It should be noted that in the present specification, the expression "when viewed in a plan view" refers to a case where the lens is viewed from the entrance surface side.

Figure 2:
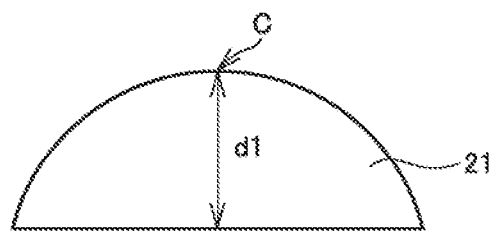
FIG. 2 shows an example of a cross sectional view taken along A-A of the lens of FIG. 1.
Figure 3:
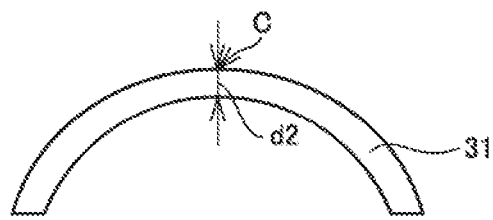
FIG. 3 shows an example of a cross sectional view taken along A-A of the lens of FIG. 1.
Figure 4:
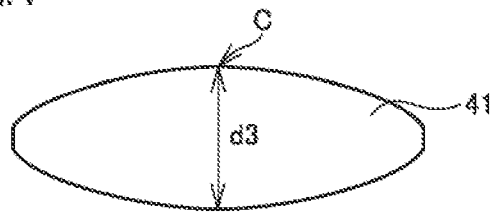
FIG. 4 shows an example of a cross sectional view taken along A-A of the lens of FIG. 1.
Figure 5:
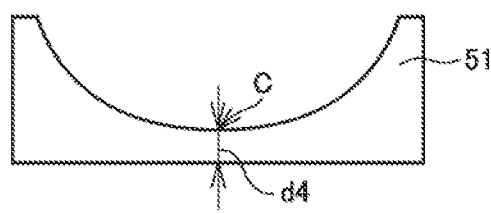
FIG. 5 shows an example of a cross sectional view taken along A-A of the lens of FIG. 1.
Figure 6:
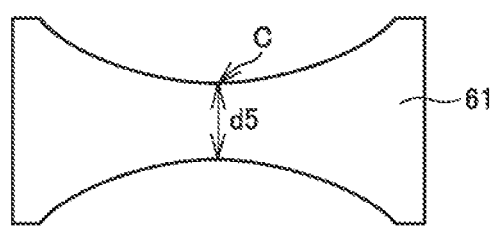
FIG. 6 shows an example of a cross sectional view taken along A-A of the lens of FIG. 1.

The shape of lens 1 is not limited particularly as long as it performs a function as a lens. FIG. 2 to FIG. 6 show examples of cross sectional views when lens 1 is taken along an A-A line passing through a lens center C. It should be noted that in the present specification, the term "lens center C" means the center of the lens when the lens is viewed in a plan view. A lens 21 shown in FIG. 2 is a planoconvex lens. A lens 31 shown in FIG. 3 is a convex meniscus lens or a concave meniscus lens. A lens 41 shown in FIG. 4 is a biconvex lens. A lens 51 shown in FIG. 5 is a planoconcave lens. A lens 61 shown in FIG. 6 is a biconcave lens. Although the upper side of each of FIG. 2 to FIG. 6 corresponds to the entrance surface side, the entrance surface side may correspond to the lower side of each of FIG. 2 to FIG. 6. For the lens, any one of the following lenses can be employed: a spherical lens having a spherical surface; an aspheric lens having an aspheric surface; a diffractive lens having a diffractive surface; and a lens array having surfaces having a plurality of spherical surfaces, aspheric surfaces, and diffractive surfaces.

Lens 1 has a thickness of not less than 1 mm and not more than 11 mm at lens center C. It should be noted that in the present specification, the "thickness at lens center C" refers to a thickness of the lens in a cross-section from lens center C of the surface on the entrance surface side of the lens to the surface on the exit surface side of the lens. For example, the "thickness at lens center C" is a length corresponding to d1 of FIG. 2, d2 of FIG. 3, d3 of FIG. 4, d4 of FIG. 5, and d5 of FIG. 6.

If the thickness of the lens at the lens center is less than 1 mm, strength of the lens is small, with the result that the lens cannot have sufficient mechanical strength. On the other hand, if the thickness of the lens at the lens center is more than 11 mm, a light transmitting property of the lens is decreased. The thickness of the lens at the lens center is preferably not less than 1 mm and not more than 11 mm, and is further preferably not less than 1.5 mm and not more than 8 mm.

Lens 1 has a lens diameter of not less than 2 mm and not more than 50 mm. It should be noted that in the present specification, the term "lens diameter" refers to an effective diameter of the lens (diameter of an optical functional surface of the lens) defined by the diameter of parallel light that can enter the lens.

If the lens diameter is more than 50 mm, strength of the lens is small, with the result that the lens cannot have sufficient mechanical strength. The lens strength becomes larger as the lens diameter is smaller; however, in view of practical use and production of the lens, the lens diameter is not less than 2 mm. The lens diameter is preferably not less than 5 mm and not more than 40 mm.

Figure 7:
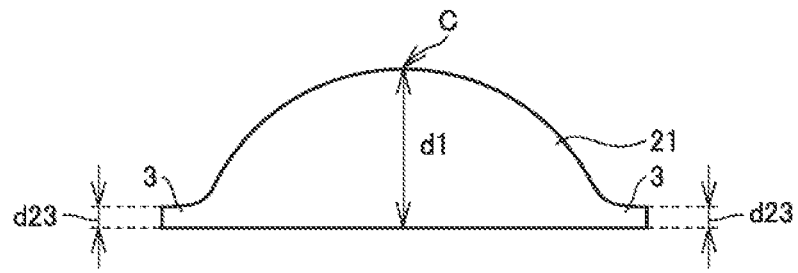
FIG. 7 is a schematic cross sectional view of a lens including an edge portion according to one embodiment of the present invention.
Figure 8:
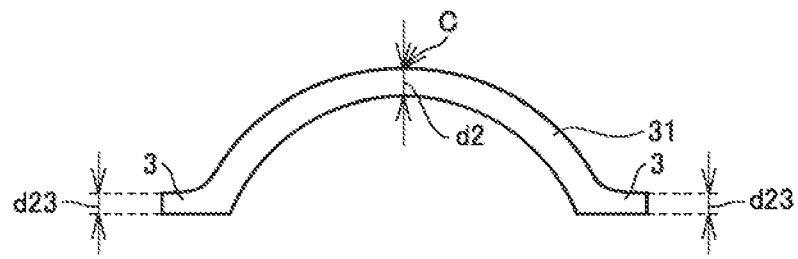
FIG. 8 is a schematic cross sectional view of a lens including an edge portion according to one embodiment of the present invention.
Figure 9:
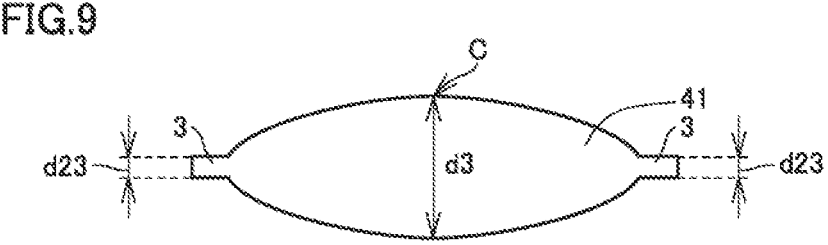
FIG. 9 is a schematic cross sectional view of a lens including an edge portion according to one embodiment of the present invention.

In the present embodiment, as shown in FIG. 7 to FIG. 9, the lens can include a continuous edge portion 3 at an outer edge portion of an optical effective area constituted of the effective diameter of the lens. Edge portion 3 is a member provided to attach the lens to the main body of an infrared detection device. Edge portion 3 preferably has a thickness d23 of not less than 1 mm in view of strength. Moreover, for size reduction of the lens, edge portion 3 can have a surface shaped to have a step.

Lens 1 has a curvature of not less than −0.5 mm$^{-1}$ and not more than 0.5 mm$^{-1}$ at the lens center. It should be noted that in the present specification, the expression "curvature at the lens center" refers to a value of the reciprocal of the curvature radius of the lens when the lens is a spherical lens, and refers to a value of curvature C, which is an aspheric constant denoted in the following formula (1), when the lens is an aspheric lens:

[Formula 1]

$$Z = \frac{C \times r^2}{1 + \sqrt{1 - (1+K)C^2 \times r^2}} + \sum_{i=1}^{n} A_i \times r^i \quad (1)$$

(C, K, $A_i$ (i=1 to n) are aspheric constants.)

(In formula (1), Z represents a sag amount (relative to a direction parallel to the optical axis of the lens), C represents the curvature, r represents a distance from the optical axis, K represents a conic constant, and Ai represents the i-th aspheric coefficient.)

It should be noted that in the present specification, the curvature at the lens center is assumed to encompass both the curvature at the lens center on the entrance surface side of the lens and the curvature at the lens center on the exit surface side of the lens. Hence, the expression "curvature at the lens center is not less than $-0.5$ mm$^{-1}$ and not more than 0.5 mm$^{-1}$" is intended to mean that both the curvature at the lens center on the entrance surface side of the lens and the curvature at the lens center on the exit surface side of the lens are not less than $-0.5$ mm$^{-1}$ and not more than 0.5 mm$^{-1}$.

When the curvature at lens center C is less than $-0.5$ mm$^{-1}$ or is more than 0.5 mm$^{-1}$, the lens strength becomes larger as the absolute value of the curvature is larger; however, in view of practical use and production of the lens, the curvature at lens center C is not less than $-0.5$ mm$^{-1}$ and not more than 0.5 mm$^{-1}$. The curvature at lens center C is preferably not less than $-0.4$ mm$^{-1}$ and not more than 0.4 mm$^{-1}$.

The thickness of the lens at the lens center and the lens diameter of the lens at the lens center preferably exhibit a relation of the following formula (A):

$$\text{Lens diameter (mm)} \leq 20 \times \text{thickness (mm)} - 50 \quad (A)$$

When the thickness and lens diameter at the lens center exhibit the relation of the formula (A), the mechanical strength of the lens is further improved, thereby obtaining mechanical strength equivalent to or higher than IK01. In order to improve the mechanical strength of the lens, the thickness and lens diameter at the lens center more preferably exhibit a relation of the following formula (B):

$$\text{Lens diameter (mm)} \leq 24 \times \text{thickness (mm)} - 79 \quad (B)$$

The lens is preferably a biconvex lens. The biconvex lens can be suitably used for wide-angle detection.

The lens is preferably a meniscus lens. The meniscus lens can be used suitably in broad applications from the wide-angle detection to telescopic detection.

Figure 10:
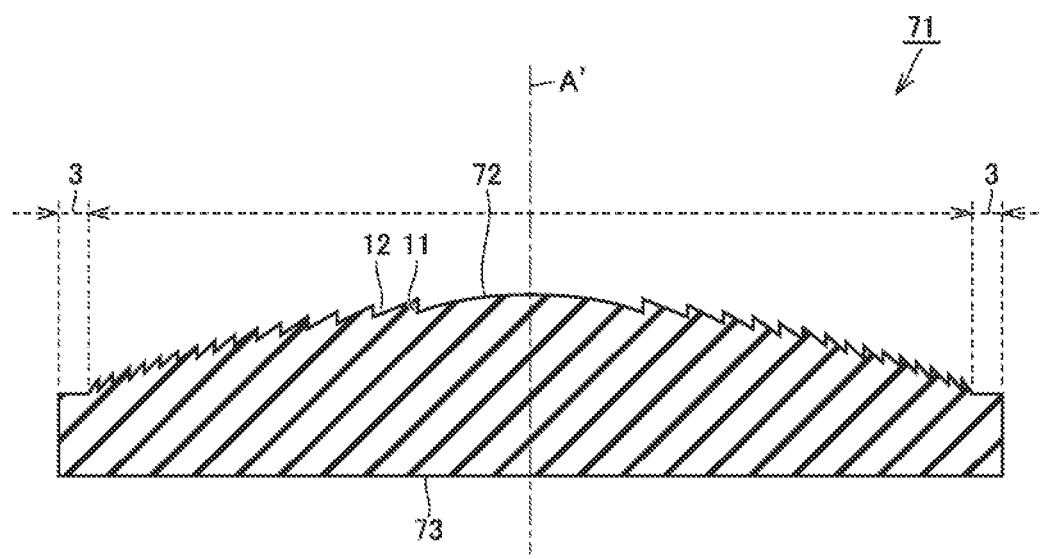
FIG. 10 is a schematic cross sectional view showing a configuration of a diffractive lens according to one embodiment of the present invention.

The lens is preferably a diffractive lens. The diffractive lens is a lens that collects light or the like by changing a travelling direction of light using a diffraction phenomenon of light. The diffractive lens has an excellent spatial frequency resolution to provide an excellent image. An example of the diffractive lens will be described with reference to FIG. 10. FIG. 10 is a schematic cross sectional view showing a configuration of the diffractive lens according to one embodiment of the present invention. Diffractive lens 71 has a disk-like shape, has one main surface 72 having a convex shape, and has the other main surface 73 having a planar shape. Moreover, one main surface 72 includes an optical effective area 10 in which projection portions 11 and groove portions 12 are formed repeatedly. Optical effective area 10 is surrounded by edge portion 3 in which projection portions 11 and groove portions 12 are not formed. Further, projection portions 11 and groove portions 12 are formed concentrically in one main surface 72 with respect to an optical axis A'.

The average value of surface roughnesses Ra in the optical effective area of the surface of the diffractive lens is preferably not more than 0.05 μm. Further, a difference between surface roughnesses Ra in the optical effective area of the surface is more preferably not more than 0.04 μm. Accordingly, the optical property of the diffractive lens can be improved significantly. Here, the term "optical effective area" refers to an area of the surface of the lens, via which light can enter and/or exit while the lens is used. Moreover, the average value of surface roughnesses Ra can be checked by, for example, measuring surface roughnesses at any five positions in the optical effective area and calculating the average thereof. Further, the difference between surface roughnesses Ra can be checked by, for example, measuring surface roughnesses at any five positions in the optical effective area and calculating a difference between the maximum value and minimum value thereof.

The material of a substrate of lens 1 is not particularly limited as long as it is a material through which infrared rays can pass. Examples of the material include: zinc sulfide (ZnS), zinc selenide (ZnSe), germanium, chalcogenide glass, silicon, and the like.

The substrate of lens 1 preferably has a Young's modulus of not less than 10 GPa and not more than 200 GPa. Accordingly, a lens having excellent mechanical strength can be obtained.

The substrate of lens 1 preferably has a bending strength of not less than 10 MPa and not more than 300 MPa. Accordingly, a lens having excellent mechanical strength can be obtained.

The substrate of lens 1 preferably has a density of not less than 2.0 g/cm$^3$ and not more than 5.5 g/cm$^3$. Accordingly, a lens having excellent mechanical strength can be obtained.

Lens 1 can be obtained by the following prodcution method, for example. First, source powder is prepared. In this step, it is preferable to prepare source powder having an average particle size of 1 to 3 μm and a purity of not less than 95%.

Next, a molding step is performed. In this step, through molding using a mono-axial type metal mold press employing a hard metal mold composed of cemented carbide, tool steel, or the like, the source powder prepared in the previous step is press-molded into a molded material having a desired outline shape, for example.

Next, a pre-sintering step is performed. In this step, the molded material produced in the molding step is heated for not less than 0.5 hour and not more than 15 hours at a temperature of not less than 500° C. and not more than 1000° C. in a vacuum atmosphere at not more than 30 Pa or an inert atmosphere such as nitrogen gas at an atmospheric pressure, thereby producing a pre-sintered material, for example. Accordingly, a pre-sintered material having a relative density of about 55 to 80 volume % is obtained, for example.

Next, a pressure-sintering step is performed. In this step, the pre-sintered material produced in the pre-sintering step is constrained in molds and heated under a pressure, and is accordingly deformed into a pressure-sintered material. Specifically, first, the pre-sintered material is placed between a pair of molds (upper mold and lower mold) each composed of glassy carbon and having a mirror-polished constraining surface, for example. Then, the pair of molds are used to press and heat the pre-sintered material at a temperature of not less than 550° C. and not more than 1200° C. under a pressure of not less than 10 MPa and not more than 300 MPa for not less than 1 minute and not more than 60 minutes, for example. Accordingly, the pre-sintered material is pressed and sintered, thereby obtaining a pressure-sintered material. It should be noted that when producing the diffractive lens, the diffractive surface having the projection portions and the groove portions can be formed by using molds having a constraining surface including a projection-portion molding portion for molding the projection portions and a groove-portion molding portion for molding the groove portions. Then, finish-machining is performed to the sintered material as required. This finish-machining can be omitted if the sintered material has an intended shape when the pressure-sintering step is completed.

Second Embodiment

An optical component according to one embodiment of the present invention includes: the lens of the first embodiment; and a diamond like carbon film (DLC film) covering at least a portion of the entrance surface of the lens. The DLC film has very high hardness, and has excellent mechanical strength. Moreover, the DLC film also has a high light transmittance. Therefore, when the DLC film is formed on the lens surface, the mechanical strength and light transmittance of the surface of the optical component can be improved.

When at least a portion of the entrance surface of the lens is covered with the DLC film, the mechanical strength of the optical component can be improved. In order to improve the mechanical strength, the DLC film preferably covers the entire entrance surface of the lens.

DLC is a carbon film having an amorphous structure in which both sp3 bond of diamond and sp2 bond of graphite are included in its crystal structure.

The physical property of the DLC is changed according to a ratio of the sp3 bond to the sp2 bond in the DLC, a ratio of hydrogen atoms in the crystal structure, presence/absence of other metallic elements in the crystal structure, or the like. Generally, when the ratio of the sp3 bond in the DLC is high, the DLC has a physical property similar to that of diamond, whereas when the ratio of the sp2 bond is high, the DLC has a physical property similar to that of graphite. Moreover, when the ratio of hydrogen atoms in the DLC is high, the DLC tends to have a polymer-like physical property.

For example, based on the sp3 bond, the sp2 bond, and the hydrogen content, the DLC can be classified into ta-C (tetrahedral amorphous carbon), a-C (amorphous carbon), ta-C:H (hydrogenated tetrahedral amorphous carbon), and a-C:H (hydrogenated amorphous carbon). Among these, ta-C is of high hardness, and is therefore suitable as a material of a protective film for a lens.

The DLC film has a very high Knoop hardness of 2000 to 10000 $kg/mm^2$ and has excellent mechanical strength and weather resistance. Moreover, the DLC film also has a high light transmittance. Therefore, when the DLC film is layered on the lens, the light transmittance of the DLC film can be improved while preventing the substrate from being damaged due to mechanical contact or long-term use under severe environment.

The DLC film preferably has a thickness of not less than 0.5 μm and not more than 10 μm.

The DLC film can be formed by a known plasma CVD method, hot filament method, ion plating method, sputtering method, ion beam method, or the like.

Third Embodiment

The optical component according to one embodiment of the present invention includes: the lens of the first embodiment; and an anti-reflection film covering at least a portion of the entrance surface of the lens. Accordingly, the light transmitting property of the lens is improved.

For the anti-reflection film, a known material can be used, such as magnesium fluoride ($MgF_2$), silicon oxide ($SiO_2$), yttrium fluoride ($YF_3$), yttrium oxide ($Y_2O_3$), and a material obtained by layering them.

The anti-reflection film preferably has a thickness of not less than 0.5 μm and not more than 10 μm.

The anti-reflection film can be formed using a known vacuum deposition method, sputtering method, or the like.

EXAMPLES

The following more specifically describes the present invention by way of examples. However, the present invention is not limited by these examples.

Production Examples 1 to 23

<Production of Lens>

As source powder, the following powder was prepared: ZnS powder having an average particle size of 2 μm and a purity of 98%; or Ge powder having an average particle size of 2 μm and a purity of 98%. Next, the source powder was molded using a mono-axial type metal mold press (cold press), thereby producing disk-like pre-molded materials each having a lens diameter shown in Table 1 and having a thickness of 1.5 mm to 20 mm. Next, the obtained pre-molded material was heated at 800° C. in a nitrogen atmosphere for 5 hours, thereby obtaining a pre-sintered material having a relative density of about 60%.

Next, in each of production examples 1 to 18, the pre-sintered material was placed between one pair of molds (upper mold and lower mold) each composed of glassy carbon and having a mirror-polished constraining surface, and the pair of molds were used to heat the pre-sintered body at 1000° C. for 300 seconds under a pressure of 50 MPa.

In each of production examples 19 to 23, molds were used having a constraining surface including a projection-portion molding portion and a groove-portion molding portion. Through the above process, a lens composed of the ZnS sintered material or Ge sintered material was obtained.

Table 1 shows the Young's modulus, bending strength, density, light transmittance (average transmittance in a wavelength of 8 to 12 μm), cross sectional shape, thickness at the lens center, lens diameter, and curvatures at the lens center on the entrance surface side and the exit surface side in the obtained lens. It should be noted that in Table 1, the light transmittance (%) of each of production examples 1, 2, and 16 represents a light transmittance (%) in a below-mentioned optical component.

<Production of Optical Component>

In each of production examples 1 and 16, a diamond like carbon film was formed on the entrance surface of the obtained lens. The DLC layer was formed at a substrate temperature of 150° C. through plasma CVD with a high frequency of 13.56 MHz using methane gas as a source material. The DLC film was designed to have a thickness of 0.5 μm.

In production example 2, an anti-reflection film was formed on the entrance surface of the obtained lens. For the anti-reflection film, $MgF_2$, $YF_2$, and $Y_2O_3$ were used as a source material. $Y_2O_3$, $YF_2$, and $MgF_2$ were formed in this order on the entrance surface of the lens through vacuum deposition employing an electron beam. The thickness of the anti-reflection film was designed such that $Y_2O_3$ was 0.05 μm, $YF_2$ was 1.3 μm, and $MgF_2$ was 0.5 μm.

<Evaluation>
[Drop Test]

A test was performed to drop a steel ball onto the obtained lens and optical component to observe crushing conditions. Specifically, in a method defined in JIS K 5600-5-3, a steel ball defined in JIS B 1501 and having a mass of 28 g and a diameter of 19 mm was used as a weight. The steel ball was dropped to hit against the lens center along the lens center axis, and then the surface of the lens was observed with eyes.

Evaluation was performed as follows. A drop height of the steel ball was increased and a drop height at which a crack was generated in both the surfaces of the lens was evaluated as a drop height (mm) at which the lens was broken. The result is shown in Table 1.

[Measurement of MTF]

For each of the lenses or optical components of production examples 1, 2, 12, 13, and 17 to 23, a MTF (Modulation Transfer Function) was measured. The MTF represents spatial frequency resolution. As the MTF is higher, a higher quality image is obtained. This MTF can be measured using a MTF measuring device for infrared lenses (YY-305 provided from Yucaly Optical Laboratory), for example. The result is shown in Table 1.

TABLE 1

| | Lens or Optical Component | | | | | | |
|---|---|---|---|---|---|---|---|
| Production Example | Source Material | Young's Modulus (GPa) | Bending Strength (MPa) | Density (g/cm$^3$) | Optical Transmittance (%) | Cross Sectional Shape | Center Thickness (mm) | Lens Diameter (mm) |
| 1 | ZnS | 74 | 86 | 4.09 | 80 | FIG. 3 | 4 | 20 |
| 2 | ZnS | 74 | 86 | 4.09 | 87 | FIG. 3 | 4 | 20 |
| 3 | ZnS | 74 | 86 | 4.09 | 73 | FIG. 2 | 0.5 | 20 |
| 4 | ZnS | 74 | 86 | 4.09 | 72 | FIG. 2 | 1 | 20 |
| 5 | ZnS | 74 | 86 | 4.09 | 72 | FIG. 2 | 1.5 | 20 |
| 6 | ZnS | 74 | 86 | 4.09 | 70 | FIG. 2 | 3 | 20 |
| 7 | ZnS | 74 | 86 | 4.09 | 68 | FIG. 2 | 4 | 20 |
| 8 | ZnS | 74 | 86 | 4.09 | 68 | FIG. 2 | 4 | 5 |
| 9 | ZnS | 74 | 86 | 4.09 | 68 | FIG. 2 | 4 | 10 |
| 10 | ZnS | 74 | 86 | 4.09 | 68 | FIG. 2 | 4 | 40 |
| 11 | ZnS | 74 | 86 | 4.09 | 68 | FIG. 2 | 4 | 50 |
| 12 | ZnS | 74 | 86 | 4.09 | 70 | FIG. 3 | 2.5 | 15 |
| 13 | ZnS | 74 | 86 | 4.09 | 67 | FIG. 3 | 5 | 35 |
| 14 | Ge | 100 | 93 | 5.32 | 46 | FIG. 2 | 3 | 20 |
| 15 | Ge | 100 | 93 | 5.32 | 45 | FIG. 2 | 5 | 20 |
| 16 | ZnS | 74 | 86 | 4.09 | 79 | FIG. 2 | 5 | 17 |
| 17 | ZnS | 74 | 86 | 4.09 | 65 | FIG. 4 | 7.5 | 15 |
| 18 | ZnS | 74 | 86 | 4.09 | 68 | FIG. 3 | 4 | 20 |
| 19 | ZnS | 74 | 86 | 4.09 | 68 | FIG. 3 | 4 | 20 |
| 20 | ZnS | 74 | 86 | 4.09 | 70 | FIG. 3 | 2.5 | 15 |
| 21 | ZnS | 74 | 86 | 4.09 | 67 | FIG. 3 | 5 | 35 |
| 22 | ZnS | 74 | 86 | 4.09 | 65 | FIG. 3 | 7 | 11 |
| 23 | ZnS | 74 | 86 | 4.09 | 65 | FIG. 4 | 7.5 | 15 |

| | Lens or Optical Component | | | | | Drop Test | MTF |
|---|---|---|---|---|---|---|---|
| | Curvature (mm$^{-1}$) | | | Optical Component | | Drop | Value on |
| Production Example | Entrance Surface | Exit Surface | Diffractive Surface | DLC Film | AR Film | Height (mm) | Axis (0°) (20 lp/mm) |
| 1 | 0.07 | 0.07 | Not Exist | Exist | Not Exist | 700 | 0.16 |
| 2 | 0.07 | 0.07 | Not Exist | Not Exist | Exist | 700 | 0.16 |
| 3 | 0 | −0.001 | Not Exist | Not Exist | Not Exist | 10 | Not Measured |
| 4 | 0 | −0.001 | Not Exist | Not Exist | Not Exist | 50 | Not Measured |
| 5 | 0 | −0.001 | Not Exist | Not Exist | Not Exist | 75 | Not Measured |
| 6 | 0 | −0.001 | Not Exist | Not Exist | Not Exist | 200 | Not Measured |
| 7 | 0 | −0.001 | Not Exist | Not Exist | Not Exist | 575 | Not Measured |
| 8 | 0 | −0.001 | Not Exist | Not Exist | Not Exist | 1500 | Not Measured |
| 9 | 0 | −0.001 | Not Exist | Not Exist | Not Exist | 900 | Not Measured |
| 10 | 0 | −0.001 | Not Exist | Not Exist | Not Exist | 400 | Not Measured |
| 11 | 0 | −0.001 | Not Exist | Not Exist | Not Exist | 200 | Not Measured |
| 12 | 0.13 | 0.17 | Not Exist | Not Exist | Not Exist | 475 | 0.15 |
| 13 | 0.036 | 0.03 | Not Exist | Not Exist | Not Exist | 733 | 0.14 |
| 14 | 0 | −0.04 | Not Exist | Not Exist | Not Exist | 500 | Not Measured |

TABLE 1-continued

| | | | | | | | |
|---|---|---|---|---|---|---|---|
| 15 | 0 | −0.001 | Not Exist | Not Exist | Not Exist | 800 | Not Measured |
| 16 | 0 | −0.02 | Not Exist | Exist | Not Exist | 1200 | Not Measured |
| 17 | 0.05 | −0.01 | Not Exist | Not Exist | Not Exist | 1600 | 0.15 |
| 18 | 0.07 | 0.07 | Not Exist | Not Exist | Not Exist | 700 | 0.16 |
| 19 | 0.07 | 0.07 | Exist | Not Exist | Not Exist | 700 | 0.55 |
| 20 | 0.13 | 0.17 | Exist | Not Exist | Not Exist | 475 | 0.55 |
| 21 | 0.036 | 0.03 | Exist | Not Exist | Not Exist | 733 | 0.50 |
| 22 | −0.05 | −0.1 | Exist | Not Exist | Not Exist | 1500 | 0.40 |
| 23 | 0.05 | −0.01 | Exist | Not Exist | Not Exist | 1600 | 0.55 |

<Evaluation Result>

The optical component of production example 1 includes: a convex meniscus lens including ZnS; and a DLC film covering the lens. The lens has a lens center thickness of 4.0 mm, has a lens diameter of 20 mm, and has curvatures of 0.07 $mm^{-1}$ on the entrance surface side and the exit surface side. The optical component of production example 1 had excellent mechanical strength.

The optical component of production example 2 includes: a convex meniscus lens including ZnS; and an anti-reflection film covering the lens. The lens has a lens center thickness of 4.0 mm, has a lens diameter of 20 mm, and has curvatures of 0.07 $mm^{-1}$ on the entrance surface side and the exit surface side. The optical component of production example 2 had excellent mechanical strength.

Each of the lenses of production examples 3 to 7 is a planoconvex lens including ZnS. The lens has a lens center thickness of 0.5 mm to 4.0 mm, has a lens diameter of 20 mm, has a curvature of 0 $mm^{-1}$ on the entrance surface side, and has a curvature of −0.001 $mm^{-1}$ on the exit surface side. From the results of the drop tests for production examples 3 to 7, it is understood that the mechanical strength of the lens is more improved as the lens center thickness is larger.

Each of the lenses of production examples 8 to 11 is a planoconvex lens including ZnS. The lens has a lens center thickness of 4.0 mm, has a lens diameter of 5 mm to 50 mm, has a curvature of 0 $mm^{-1}$ on the entrance surface side, and has a curvature of −0.001 $mm^{-1}$ on the exit surface side. From the results of the drop tests for production examples 8 to 11, it is understood that the mechanical strength of the lens is more improved as the lens diameter thickness is smaller.

Each of the lenses of production examples 12 and 13 is a convex meniscus lens including ZnS. The lens has a lens center thickness of 2.5 mm to 5.0 mm, has a lens diameter of 15 mm to 35 mm, has a curvature of 0.036 $mm^{-1}$ to 0.13 $mm^{-1}$ on the entrance surface side, and has a curvature of 0.03 $mm^{-1}$ to 0.17 $mm^{-1}$ on the exit surface side. Each of the lenses had excellent mechanical strength.

Each of the lenses of production examples 14 and 15 is a planoconvex lens including Ge. The lens has a lens center thickness of 3.0 to 5.0 mm, has a lens diameter of 20 mm, has a curvature of 0 $mm^{-1}$ on the entrance surface side, and has a curvature of −0.04 $mm^{-1}$ to −0.001 $mm^{-1}$ on the exit surface side. Each of the lenses had excellent mechanical strength.

The optical component of production example 16 includes: a planoconvex lens including ZnS; and a DLC film covering the lens. The lens has a lens center thickness of 5.0 mm, has a lens diameter of 17 mm, has a curvature of 0 $mm^{-1}$ on the entrance surface side, and has a curvature of −0.02 $mm^{-1}$ on the exit surface side. The optical component of production example 16 had excellent mechanical strength.

The lens of production example 17 is a biconvex lens including ZnS. The lens has a lens center thickness of 7.5 mm, has a lens diameter of 15 mm, has a curvature of 0.05 $mm^{-1}$ on the entrance surface side, and has a curvature of −0.01 $mm^{-1}$ on the exit surface side. The lens of production example 17 had excellent mechanical strength.

The lens of production example 18 is a convex meniscus lens including ZnS. The lens has a lens center thickness of 4 mm, has a lens diameter of 20 mm, and has curvatures of 0.07 $mm^{-1}$ on the entrance surface side and the exit surface side. The lens of production example 18 had excellent mechanical strength.

The lens of production example 19 is a convex meniscus lens including ZnS. The lens has a lens center thickness of 4 mm, has a lens diameter of 20 mm, and has curvatures of 0.07 $mm^{-1}$ on the entrance surface side and the exit surface side, and has a diffractive surface. In comparison between production example 18 and production example 19, the MTF was improved in the lens of production example 19.

Each of the lenses of production examples 20 and 21 is a convex meniscus lens including ZnS. The lens has a lens center thickness of 2.5 mm to 5.0 mm, has a lens diameter of 15 mm to 35 mm, has a curvature of 0.036 $mm^{-1}$ to 0.13 $mm^{-1}$ on the entrance surface side, has a curvature of 0.03 $mm^{-1}$ to 0.17 $mm^{-1}$ on the exit surface side, and has a diffractive surface. In comparison between production example 12 and production example 20, the MTF was improved in the lens of production example 20. In comparison between production example 13 and production example 21, the MTF was improved in the lens of production example 21.

The lens of production example 22 is a convex meniscus lens including ZnS. The lens has a lens center thickness of 7.0 mm, has a lens diameter of 11 mm, has a curvature of −0.05 $mm^{-1}$ on the entrance surface side, has a curvature of −0.1 $mm^{-1}$ on the exit surface side, and has a diffractive surface. The optical component of production example 22 had excellent mechanical strength and excellent MTF.

The lens of production example 23 is a biconvex lens including ZnS. The lens has a lens center thickness of 7.5 mm, has a lens diameter of 15 mm, has a curvature of 0.05 $mm^{-1}$ on the entrance surface side, has a curvature of −0.01 $mm^{-1}$ on the exit surface side, and has a diffractive surface. The optical component of production example 23 had excellent mechanical strength and excellent MTF.

The embodiments and examples disclosed herein are illustrative and non-restrictive in any respect. The scope of the present invention is defined by the terms of the claims, rather than the embodiments described above, and is intended to include any modifications within the scope and meaning equivalent to the terms of the claims.

INDUSTRIAL APPLICABILITY

The lens and optical component of the present invention is beneficially applicable to devices, such as an in-vehicle camera, a security camera, thermography, an airplane, and a satellite.

REFERENCE SIGNS LIST

1, 21, 31, 41, 51, 61, 71: lens.

The invention claimed is:

1. An optical component comprising:
   a lens having a circular shape when viewed in a plan view, and forming the outermost layer of the optical component; and
   a diamond like carbon film covering at least a portion of an entrance surface side of the lens,
   the lens is composed of zinc sulfide,
   the optical component allows infrared rays having a wavelength of 8 to 12 μm to pass therethrough,
   the lens is a diffractive lens,
   a surface of the diffractive lens has not more than 0.05 μm of an average value of surface roughnesses Ra in an optical effective area,
   the lens has a diffractive surface on an exit surface side, and the lens does not have the diffractive surface on the entrance surface side,
   the lens has a bending strength of not less than 10 MPa and not more than 300 MPa, and
   the following conditions (a), (b) and (c) are simultaneously satisfied:
   (a) lens diameter (mm)≤20×thickness (mm)−50,
   (b) the lens has a thickness of more than 3 mm and not more than 7.5 mm at a lens center, and
   (c) the lens has a lens diameter of not less than 5 mm and not more than 40 mm.

2. The optical component according to claim 1, wherein the lens is a biconvex lens.

3. The optical component according to claim 1, wherein the lens is a meniscus lens.

4. The optical component according to claim 1, wherein the lens has a Young's modulus of not less than 10 GPa and not more than 200 GPa.

5. The optical component according to claim 1, wherein the lens has a density of not less than 2.0 g/cm$^3$ and not more than 5.5 g/cm$^3$, wherein the density represents the mass of the material of the lens per unit volume.

* * * * *